(12) United States Patent
Mishra et al.

(10) Patent No.: US 8,611,471 B2
(45) Date of Patent: Dec. 17, 2013

(54) METHOD AND SYSTEM FOR RELIABLE CFO AND STO ESTIMATION IN THE PRESENCE OF TUNER INDUCED IMPAIRMENT

(75) Inventors: Saurabh Mishra, Madhepura (IN); Parag Naik, Bangalore (IN); Subrahmanya Kondageri Shankaraiah, Bangalore (IN); S Harish Krishnan, Bangalore (IN); Gururaj Padaki, Bangalore (IN)

(73) Assignee: Saankhya Labs Pvt. Ltd., Bangalore (IN)

( * ) Notice: Subject to any disclaimer, the term of this patent is extended or adjusted under 35 U.S.C. 154(b) by 8 days.

(21) Appl. No.: 13/435,945

(22) Filed: Mar. 30, 2012

(65) Prior Publication Data

US 2012/0250750 A1    Oct. 4, 2012

(30) Foreign Application Priority Data

Mar. 31, 2011    (IN) .......................... 1092/CHE/2011

(51) Int. Cl.
*H04L 27/00* (2006.01)

(52) U.S. Cl.
USPC ....... 375/326; 370/395.62; 375/232; 375/327

(58) Field of Classification Search
None
See application file for complete search history.

(56) References Cited

U.S. PATENT DOCUMENTS

| | | | |
|---|---|---|---|
| 6,535,553 B1 * | 3/2003 | Limberg et al. | 375/232 |
| 7,012,881 B2 | 3/2006 | Kim | |
| 7,031,405 B1 * | 4/2006 | Touzni et al. | 375/326 |
| 7,038,730 B2 * | 5/2006 | Markman et al. | 348/607 |
| 7,254,204 B2 | 8/2007 | Sang et al. | |
| 7,463,699 B2 | 12/2008 | Zhang et al. | |
| 7,509,565 B2 * | 3/2009 | Lu et al. | 714/784 |
| 7,630,463 B2 | 12/2009 | Shin et al. | |
| 7,643,577 B2 * | 1/2010 | Lee | 375/321 |
| 7,693,039 B2 | 4/2010 | Roh et al. | |

FOREIGN PATENT DOCUMENTS

WO    2007074388 A2    7/2007

\* cited by examiner

*Primary Examiner* — Adolf Dsouza
(74) *Attorney, Agent, or Firm* — Rahman LLC

(57) ABSTRACT

A system and method for reducing implementation complexity for estimation of a Carrier Frequency Offset (CFO) and a Symbol Timing Offset (STO) for an input signal for spectrally shaped multiple communication standards. The system is implemented by replacing multiplier with shifters. The system includes a CFO estimation block, a STO estimation block, and a band extraction block that extracts a lower band edge and an upper band edge of the input signal. The STO estimation block includes (i) a sample error generation block that computes a sampling timing error value, and (ii) a Phase Lock Loop block that estimates a frequency error and a phase error corresponding to the sampling timing error value. The CFO estimation block includes (i) a carrier offset error generation block that generates a carrier offset error value, and (ii) a leaky average block for performing a filter operation.

11 Claims, 15 Drawing Sheets

METHOD AND SYSTEM FOR RELIABLE CFO AND STO ESTIMATION IN THE PRESENCE OF TUNER INDUCED IMPAIRMENT

CROSS-REFERENCE TO RELATED APPLICATIONS

This application claims priority to Indian patent application no. 1092/CHE/2011 filed on Mar. 31, 2011, the complete disclosure of which, in its entirety, is herein incorporated by reference.

BACKGROUND

1. Technical Field

The embodiments herein generally relate to communication receiver and, more particularly, to low power receivers reducing implementation complexity in estimation of a Carrier Frequency Offset (CFO) and a Symbol Timing Offset (STO) for spectrally shaped multiple communication standards by eliminating the use of multipliers.

2. Description of the Related Art

Carrier frequency offset (CFO) compensation is a critical issue for receiver design. CFO is mainly caused by a mismatch between a transmitter oscillator and a receiver oscillator. Signal acquisition in coherent demodulation requires convergence of several complex signal processing algorithms, which include symbol timing offset (STO) and carrier frequency offset (CFO) estimation. Power and area reduction is the main concern for low power devices and thus require minimizing implementation complexity involved in STO and CFO estimations.

FIG. 1 illustrates an exploded view of a typical implementation of band extraction. In this typical implementation, low pass filters 102 are used for band extraction for a CFO estimation 104 and a STO estimation 106. An error or precision loss in the low pass filter 102 output will affect the CFO estimation 104 and the STO estimation 106 which lead to inaccurate estimations.

FIG. 2 illustrates an exploded view of a typical implementation of symbol timing offset (STO) estimation based on Godard's method, which adaptively search for a best sampling phase by generating a sampling error by a sampling error generation block 202 using energy maximization followed by a phase lock loop 204. In such an implementation, any loss in precision of estimation will affect final convergence.

Most of the commonly used schemes for STO are more sensitive to CFO or require a carrier frequency to be locked prior to STO estimation. Similarly, low complexity schemes for CFO such as decision directed based carrier recovery methods, are influenced by symbol timing offsets and require symbol synchronization before carrier estimation. All these dependencies lead to a complex implementation, if an effort is made to combine them, to achieve fast signal acquisition.

FIG. 3 illustrates an exploded view of a typical implementation of spectrum shape based carrier frequency offset (CFO) estimation. Here, an upper band edge 302 and a lower band edge 304 are extracted and an energy difference is filtered by a low pass filter 306 to minimize estimation jitter. The carrier frequency offset estimation is proportional to the low pass filter 306 output. Any error that occurs in the low pass filter output 306 will have an impact on the carrier frequency offset (CFO) estimation.

An analog signal chain of the transmitter and receiver can introduce spectrum tilt. This spectrum tilt can influence an accurate estimation of the carrier frequency offset when spectral shape based schemes are used. Spectrum shape based schemes are simple to implement, adaptive in nature, cover a wide range of communication standards, and can be used to estimate CFO and STO concurrently. However, these schemes are highly influenced by spectral tilt impairments, which lead to a totally incorrect estimation in the presence of such impairments.

Most receivers estimate the carrier frequency offset (CFO) and the symbol timing offset (STO) concurrently to avoid dependencies and sensitivity towards each other. For an example, an accurate STO estimation needs to be done before decision directed based CFO estimation schemes. Similarly, a coarse CFO estimation is needed if decision directed schemes are used to estimate STO. Individual efforts have been made to optimize implementation, but have resulted in performance degradation in term of acquisition range and time. Many solutions have been proposed to the problem of CFO estimation, but none of them reduce the complexity of an accurate CFO estimation.

SUMMARY

In view of the foregoing, an embodiment herein provides a system for reducing implementation complexity for estimation of carrier frequency offset (CFO) and symbol timing offset (STO) for spectrally shaped multiple communication standards. The system replaces a plurality of multiplier with a plurality of shifters. The system includes (i) a carrier frequency offset (CFO) estimation block, (ii) a band extraction block, (iii) a symbol timing offset estimation block (STO). The band extraction block extracts a lower band edge and an upper band edge of an input signal required for CFO and STO estimations. The spectrum tilt information can be compensated with the CFO estimation block for leveraging on the spectral shape and performing a concurrent estimation of CFO and STO. The STO estimation block includes (a) a sample error generation block and (b) a Phase Lock Loop (PLL) block. The sample error generation block generates a sampling timing error value by multiplying the upper band edge with a conjugate of the lower band edge from the band extraction block. The phase lock loop block for estimation of the STO estimates a frequency and phase error corresponding to the sampling timing error value. The frequency and phase error corresponding to the sampling timing error value is estimated using a proportion integral (PI) based second order phase lock loop.

In another aspect, a system for reducing implementation complexity in estimation of a Carrier Frequency Offset (CFO) and a Symbol Timing Offset (STO) for spectrally shaped multiple communication standards is provided. The system includes (i) a symbol timing offset estimation block that estimates the STO, (ii) a band extraction block that extracts a lower band edge and an upper band edge of an input signal required for CFO estimation and (iii) a CFO estimation block. The CFO estimation block includes (a) a carrier offset error generation block and (b) a leaky average block. The carrier offset error generation block generates a carrier offset error value by obtaining an energy difference between the upper band edge and the lower band edge and the leaky average block performs a low pass filtering on the energy difference. The spectrum tilt correction factor obtained from tilt information and a corresponding shift value is applied to estimate the CFO. The tilt information is compensated with the CFO estimation block for performing a concurrent estimation of the CFO and STO.

The system also includes an analog front end, an analog to digital converter (ADC), a down conversion block, a signal conditioning filter, a sample rate converter (SRC), a numerically controlled oscillator (NCO). The received RF analog signal is converted into a digital Intermediate frequency (IF) or Low IF (LIF) or Zero IF (ZIF) signal using the analog front end and the ADC. Further the digital IF or LIF or ZIF signal is down converted to baseband complex samples using a mixer based on the phase value generated in the NCO. The sample rate converter (SRC) converts baseband complex samples to the required sampling frequency and phase, which is controlled by the STO estimation block.

In yet another aspect, a method for reducing implementation complexity in estimation of a Carrier Frequency Offset (CFO) and a Symbol Timing Offset (STO) for an input signal for spectrally shaped multiple communication standards in a receiver is provided. The method includes (i) extracting of an upper band edge and a lower band edge of an input signal, (ii) estimating the STO when the upper band edge and the lower band edge are extracted, (iii) determining whether a carrier frequency is recovered, and (iv) estimating the CFO only when the carrier frequency is not recovered. The method of estimating the STO includes (i) estimating a sampling timing error value by multiplying the upper band edge with a conjugate of the lower band edge, and (ii) estimating a frequency error and a phase error corresponding to the sampling timing error value using a proportion integral (PI) based a second order Phase Lock Loop (PLL). The method of estimating the CFO includes (i) generating a carrier offset error value by obtaining an energy difference between the upper band edge and the lower band edge, and (ii) performing a filter operation on the energy difference. A spectrum tilt correction factor influences an accurate estimation of the CFO based on spectrum tilt information obtained from a tuner of the receiver.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
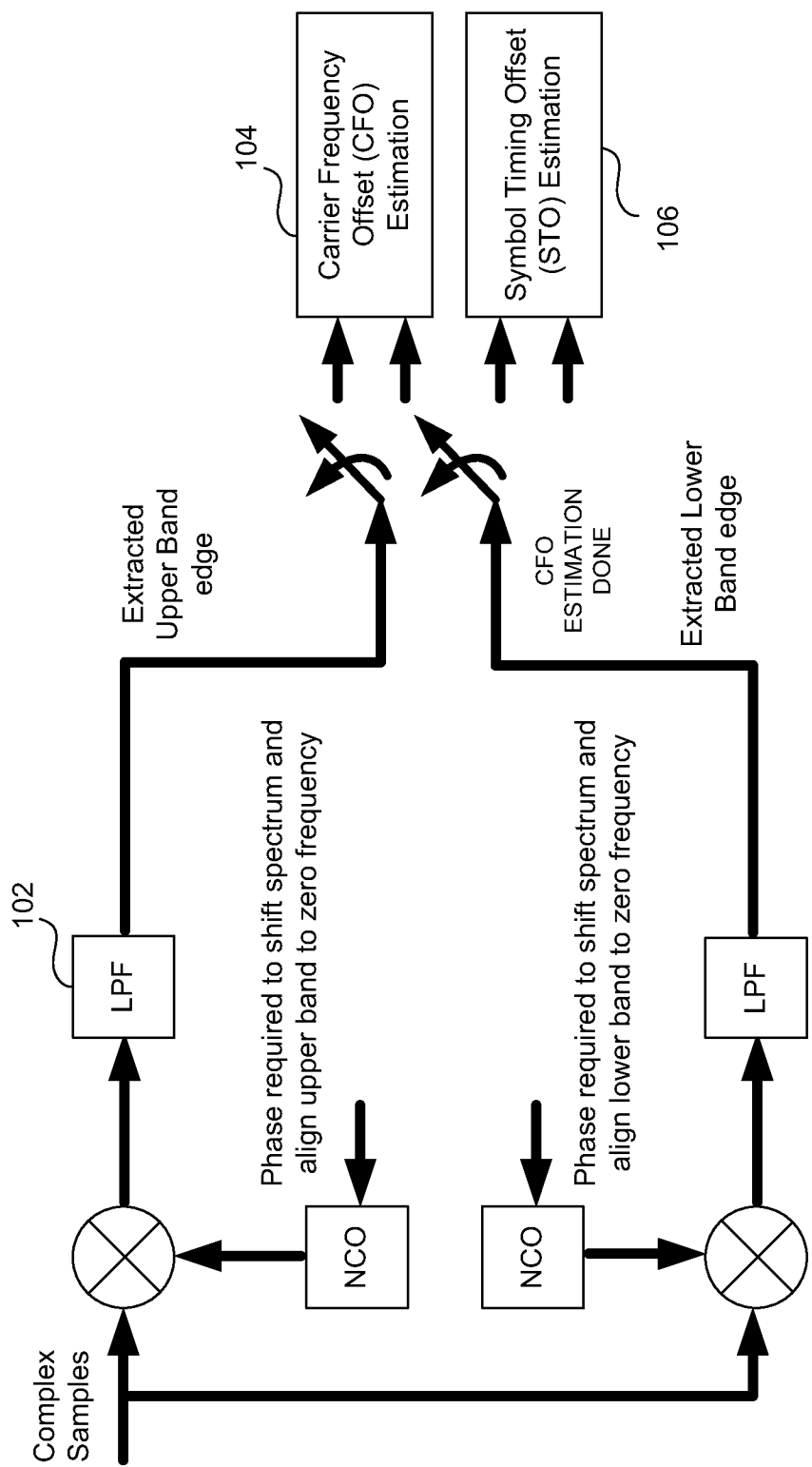
FIG. 1 illustrates an exploded view of a typical implementation of band extraction.
Figure 2:
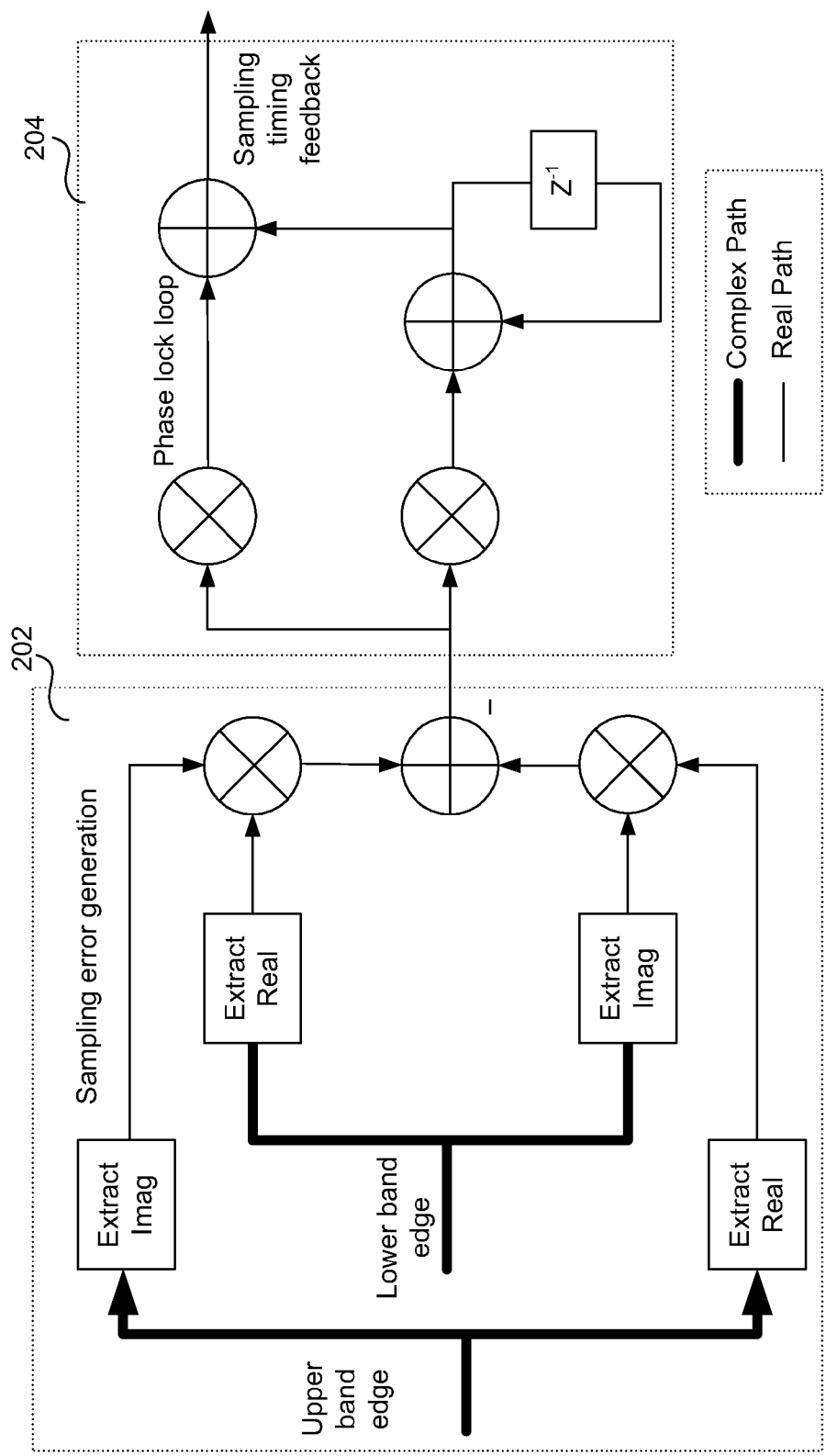
FIG. 2 illustrates an exploded view of a typical implementation of symbol timing offset (STO) estimation based on Godard's method.
Figure 3:
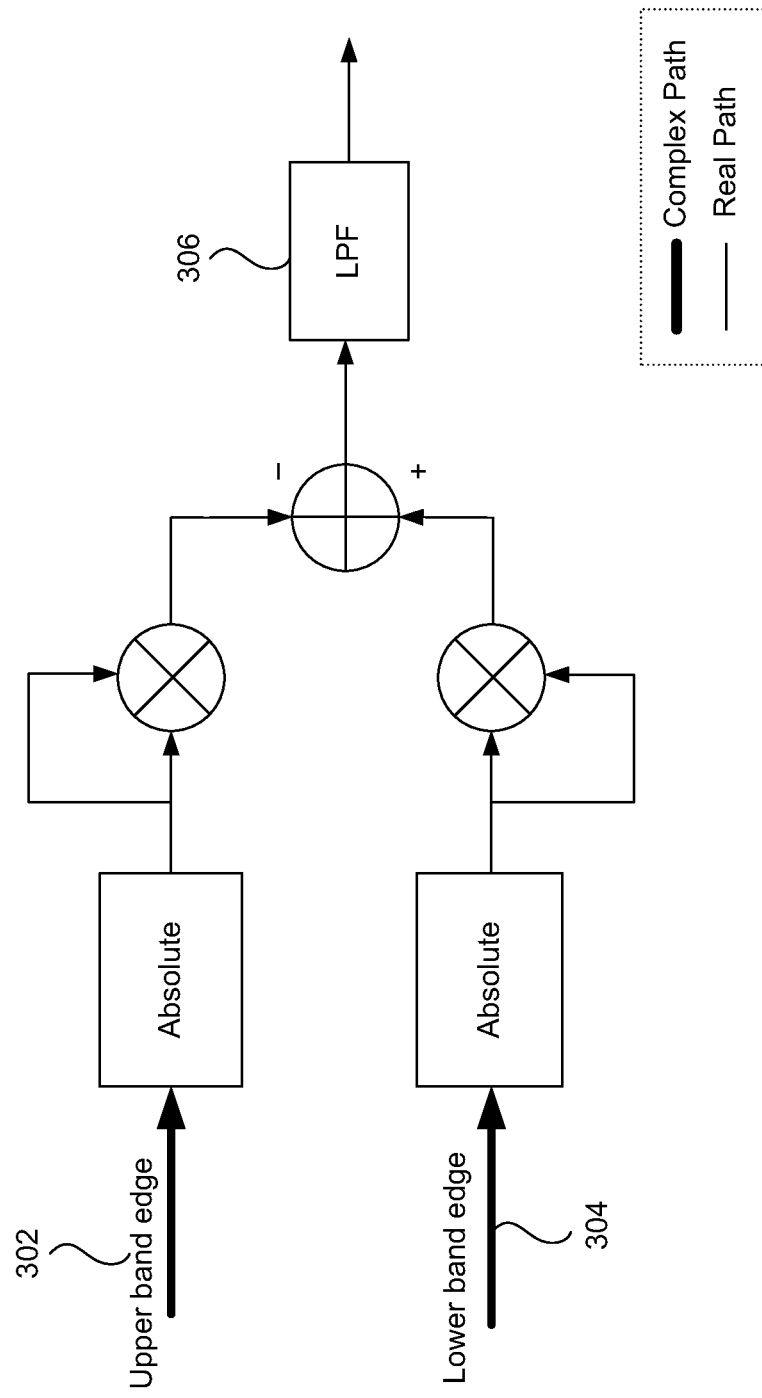
FIG. 3 illustrates an exploded view of a typical implementation of spectrum shape based carrier frequency offset (CFO) estimation.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Referring now to the drawings, and more particularly to FIG. 4 through FIG. 11, where similar reference characters denote corresponding features consistently throughout the figures, there are shown preferred embodiments.

Figure 4:
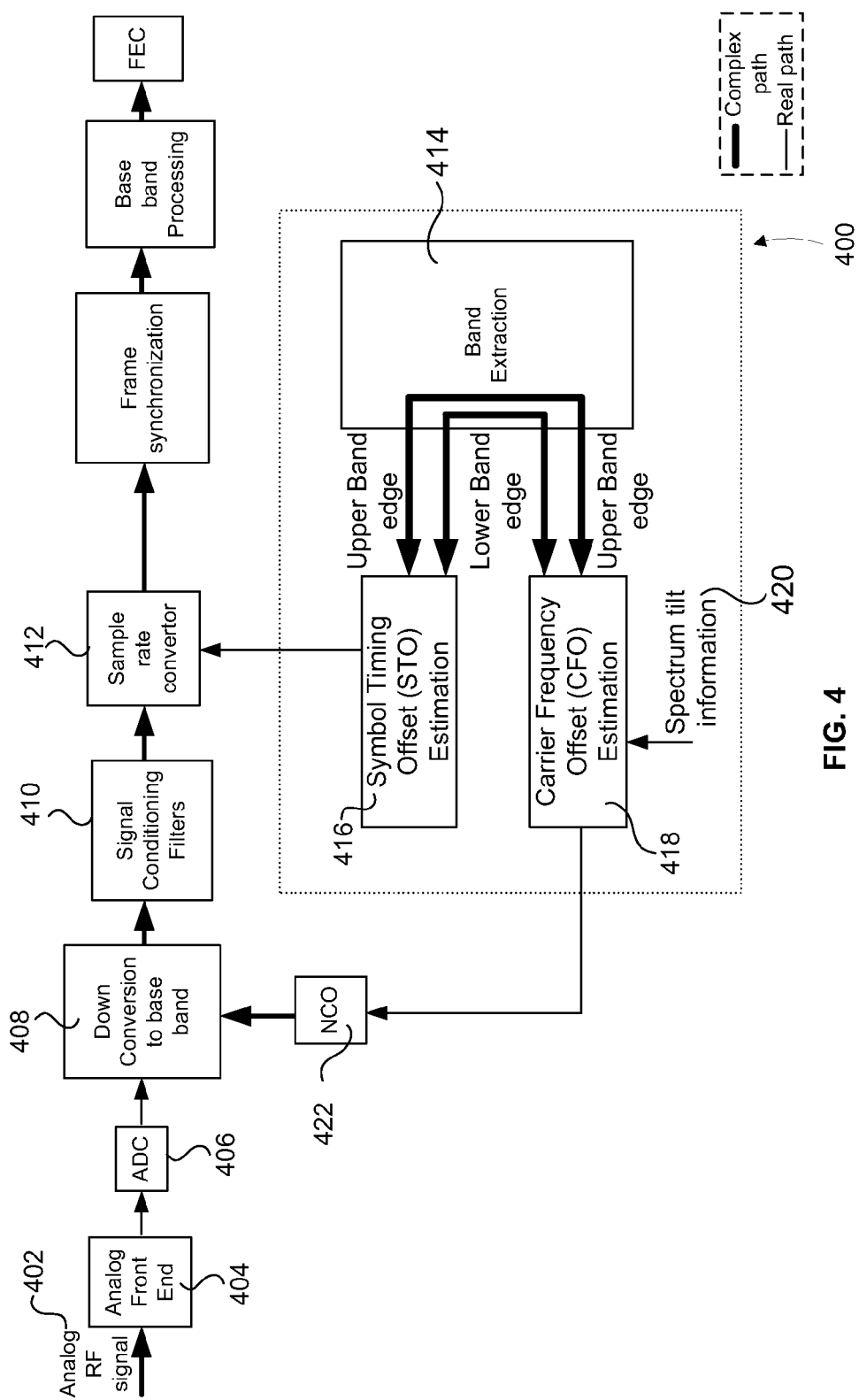
FIG. 4 illustrates an exploded view of a receiver architecture according to an embodiment herein.

FIG. 4 illustrates an exploded view of a receiver 400 according to an embodiment herein. The receiver 400 includes an analog RF signal 402, an analog front end 404, an analog to digital converter (ADC) 406, a down conversion block 408, a signal conditioning filters 410, a sample rate converter (SRC) 412, a band extraction block 414, a Symbol Timing Offset (STO) estimation block 416, a Carrier Frequency Offset (CFO) estimation block 418, a spectrum tilt information 420, and a Numerically Controlled Oscillator (NCO) 422.

The analog RF signal 402 received at analog front end 404 is down-converted to a Intermediate frequency (IF) signal or a Low IF signal or a Zero IF signal and filtered using a tuner (not shown in FIG. 4). The ADC 406 converts the IF signal to digital samples. The digital samples are down converted to a baseband complex signal using a combination of a mixer and the numerically controlled oscillator (NCO) 422. The NCO 422 generates the complex signal for the down conversion block 408 using a required input frequency and phase. The CFO estimation block 418 controls the required input frequency and the phase value are for locking a carrier frequency. Additionally, unwanted adjacent bands are rejected and an appropriate spectrally shaped spectrum is obtained to match with a transmitter filter used for pulse shaping. In one embodiment, the signal conditioning filters 410 rejects the unwanted out-of-bands from the baseband complex signal to obtain the appropriate spectrally shaped spectrum.

In one embodiment, a sampling rate at the band extraction block 414 is two times (or twice) a symbol rate. The sample rate converter (SRC) 412 converts the baseband complex samples to the required sampling frequency and phase, which is controlled by the STO estimation block 416. The band extraction block 414 extracts a lower band edge and an upper band edge for estimating a Carrier Frequency Offset (CFO) and a Symbol Timing Offset (STO). The spectrum tilt information 420 is obtained from the tuner of the receiver 400. The spectrum tilt information 420 can be compensated with the CFO estimation block 418 for leveraging on the spectrally shaped spectrum and further to concurrently estimate the CFO and the STO.

Figure 5:
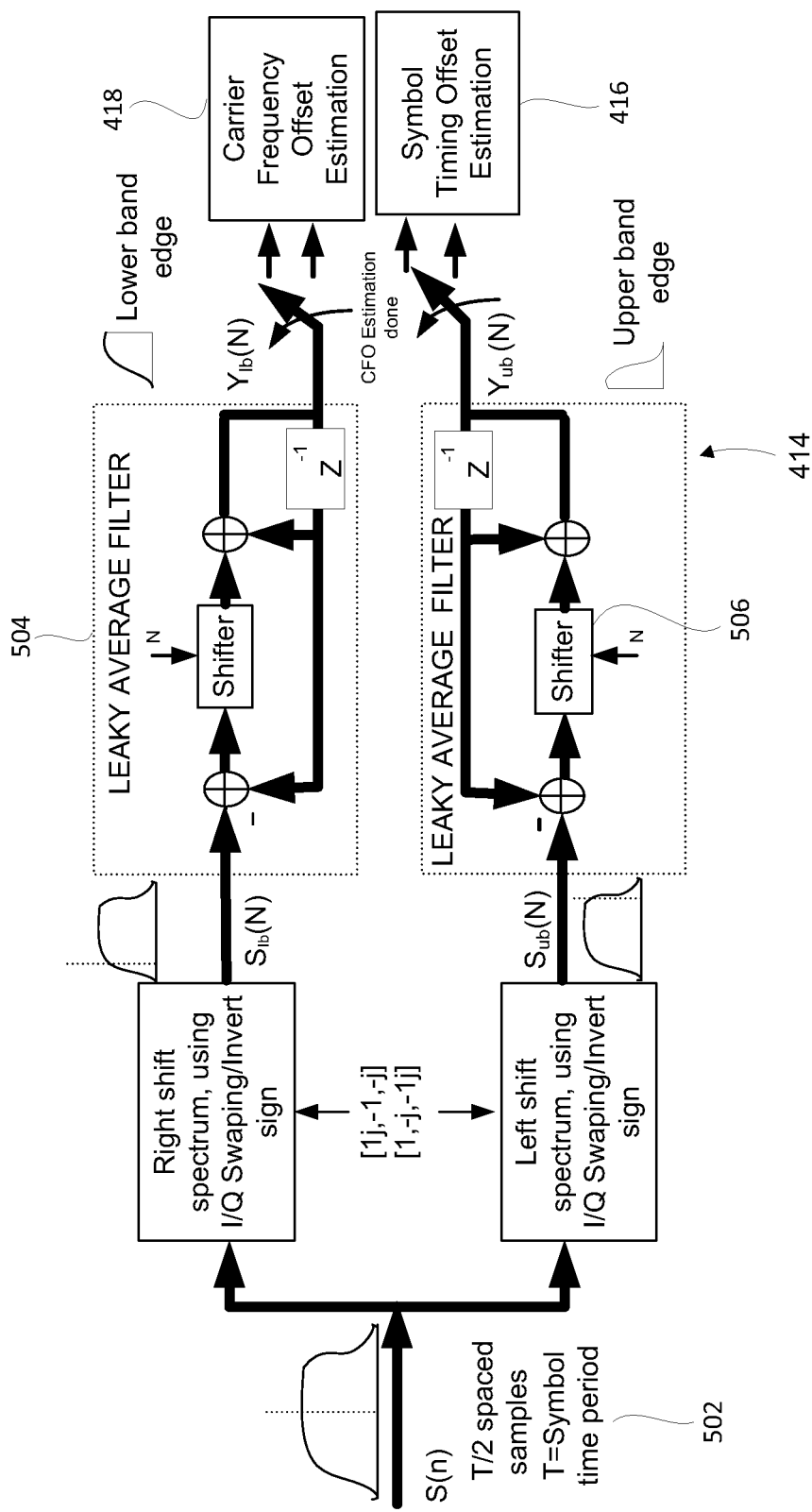
FIG. 5 illustrates an exploded view of the band extraction block of FIG. 4 according to an embodiment herein.

FIG. 5 illustrates an exploded view of the band extraction block 414 of FIG. 4 according to an embodiment herein. The band extraction block 414 includes the carrier frequency offset (CFO) estimation block 418, the symbol timing offset (STO) estimation block 416, a sample input data 502, a leaky average filter 504, and a shifter 506. For extracting band edge for CFO and STO estimation, the band extraction block 414 is required to sample input data 502 more than a symbol rate. The mixer and the NCO 422 are used to shift spectrum. In one embodiment, the use of NCO 422 can be avoided to generate required phases when sampling is done with an integral multiple of the symbol rate. In one embodiment, only four phases are required for the mixer to shift the spectrally shaped spectrum by an appropriate value.

In another embodiment, the four phases are $\pi/2$, $\pi$, $3\pi/2$ and $\pi$ (where $\pi$ equals to 180 degree), which corresponds to [j, -1, -j, 1] and [-j, -1, j, 1] as outputs from the NCO 422. These phases are used for extracting the lower band edge, and the upper band edge. Here j is an imaginary operator, which results in $\pi/2$ rotation of any complex number when multiplied. Hence, multiplication by $\pm j$ and $\pm 1$ does not require a multiplier, which can be achieved with real and imaginary components of a complex input symbols.

Assuming $s[n]=x+j^*y$ are the complex input symbols that need to be shifted using the above scheme, the lower band edge is extracted in accordance with equations:

$$S_{lb}[n]=s[n]^*[1,-j,-1,j]$$

$$S_{lb}[n]=x+jy^*[1,j,-1,-j]$$

$$S_{lb}[n]=[x+jy,-y+jx,-x-jy,y-jx] \quad (1)$$

Similarly, the upper band edge is extracted in accordance with equations:

$$S_{ub}[n]=s[n]^*[1,-j,-1,j]$$

$$S_{ub}[n]=x+jy^*[1,-j,-1,j]$$

$$S_{ub}[n]=[x+jy,y-jx,-x-jy,-y+jx] \quad (2)$$

The above equations (equations (1) and (2)) indicate that multiplication by $\pm j$ can be achieved by (i) swapping real (I) and imaginary (Q) components, and (ii) performing a sign inversion (if required). Similarly, multiplication by -1, requires a sign inversion of real and imaginary components.

The leaky average filter 504 (also referred as a one tap integrator) is used for low pass filtering. The coefficient of leaky average filter 504 is selected to be a power of 2 that enables to replace a multiplier with a shifter (e.g., the shifter 506). Leaky averaging filter operation can be analyzed by a way of an example as given below:

Assume, x(n) be the digital sample that requires to be low pass filtered using the coefficient of the Leaky average filter 504. X(n) equals k. Filter output y[n] for the lower band edge can be expressed in accordance with an equation:

$$y_{lb}[n]=s_{lb}[n]^*k+y_{lb}[n-i]^*(1-k) \quad (3)$$

where, $y_{lb}[n-1]$ is the previous output of the filter.

Further, the value of k is selected to be power 2, to replace a multiplier by the shifter 506 as shown in equation (4) below, $$y_{lb}[n]=s_{lb}[n]>>N+y_{lb}[n-1]-y_{lb}[n]>>N \quad (4)$$

Rearranging the equation (4) results in equation (5) as below, $$y_{lb}[n]=[s_{lb}[n]-y_{lb}[n]]>>N+y_{lb}[n-1] \quad (5)$$

Similarly, filter output y[n] for the upper band edge can be expressed as $$y_{ub}[n]=[s_{ub}[n]-y_{ub}[n]]>>N+y_{ub}[n-1] \quad (6)$$

Figure 6A:
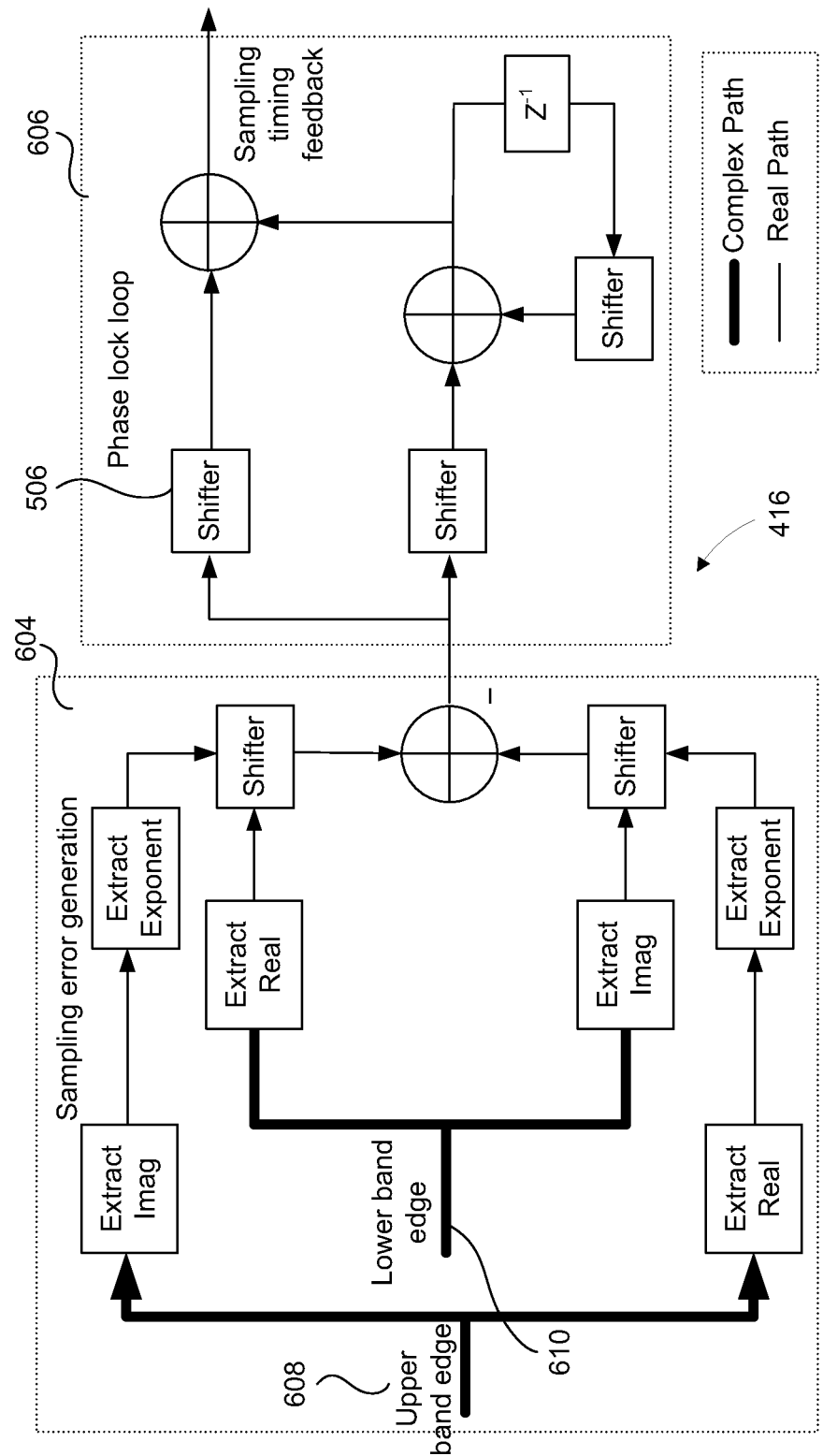
FIG. 6A illustrates an exploded view for symbol timing offset estimation block of FIG. 4 according to an embodiment herein.

FIG. 6A illustrates an exploded view of the Symbol Timing Offset estimation block 416 of FIG. 4 according to an embodiment herein. The Symbol Timing Offset estimation block 416 includes the shifter 506, a sampling timing error generation 604, a Phase Lock Loop (PLL) 606, an upper band edge 608, and a lower band edge 610. In particular, FIG. 6A illustrates a two step process of optimized implementation of Godard's scheme. The two steps of optimized implementation of Godard's scheme are the sampling timing error generation 604 and the phase lock loop (PLL) 606. First, for the sampling timing error generation 604, the upper band edge 608 is multiplied with a conjugate of the lower band edge 610. An imaginary component of the result (e.g., the multiplied result) is used as a sampling timing error. In one embodiment, one or more shifters (e.g., the shifters 502) are used instead of a multiplier for estimating the STO. The shift amount is proportional to an exponent of one of the operands. Second, for the Phase Lock Loop 606, a proportion Integral (PI) based second order PLL is used for estimating a frequency error and a phase error corresponding to a sampling time. Coefficients of the PLL 606 are selected to be a power of 2 such that multipliers are replaced by the shifters 502.

Figure 6B:
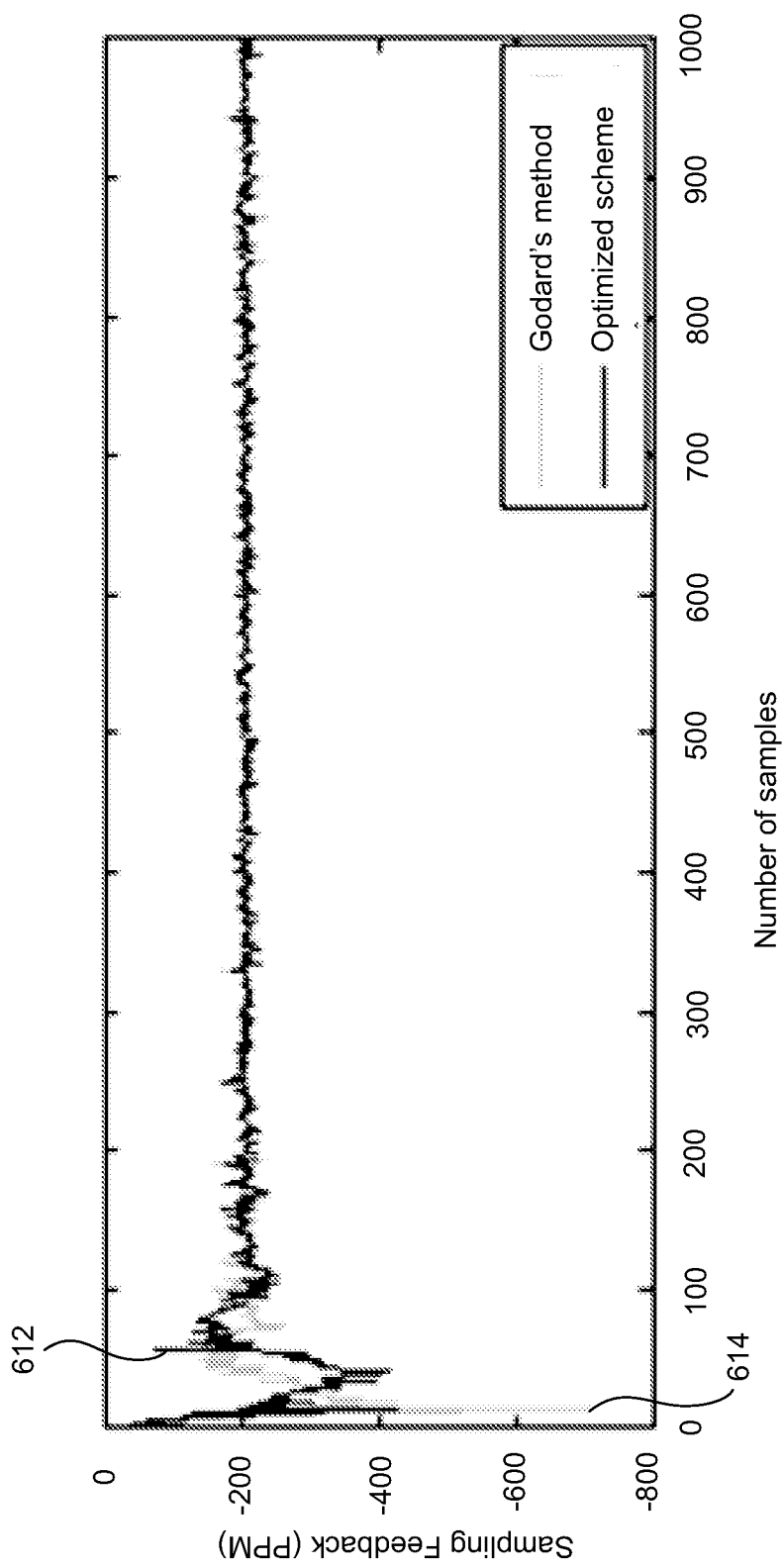
FIG. 6B is a graphical representation of comparison between Godard's method and optimized symbol timing offset estimation scheme according to an embodiment herein.

With reference to FIG. 6A, FIG. 6B is a graphical representation illustrating a comparison between the Godard's method and the optimized symbol timing offset estimation scheme according to an embodiment herein. The graphical representation indicates that the comparison between symbol timing offset estimation by optimized scheme 612 and the Godard's scheme 614 with reference to a number of samples in X-axis and a sampling feedback in Y-axis. This graphical representation indicates the performance comparison of Symbol Timing Offset estimation between Godard's method and optimized scheme.

Figure 6C:
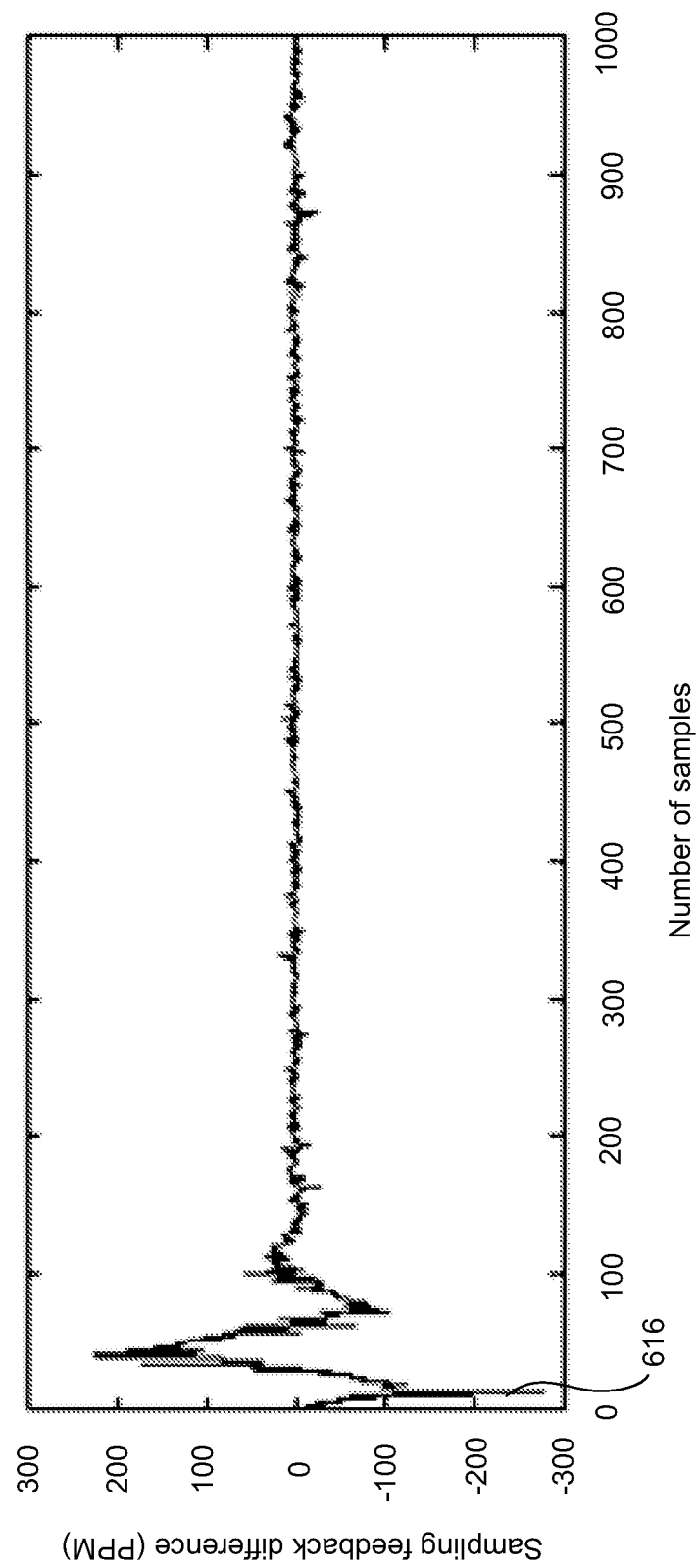
FIG. 6C is a graphical representation of sampling feedback difference between Godard's method and optimized symbol timing offset estimation scheme according to an embodiment herein.

With reference to FIG. 6A and FIG. 6B, FIG. 6C is a graphical representation of the sampling feedback difference between the Godard's method and the optimized Symbol Timing Offset estimation scheme according to an embodiment herein. A graph 616 shows the sampling feedback difference between typical Godard's method and optimized implementation scheme with reference to a number of samples in X-axis and the sampling feedback difference of Symbol Timing Offset estimation between the typical Godard's method and the optimized implementation scheme in Y-axis.

Figure 7:
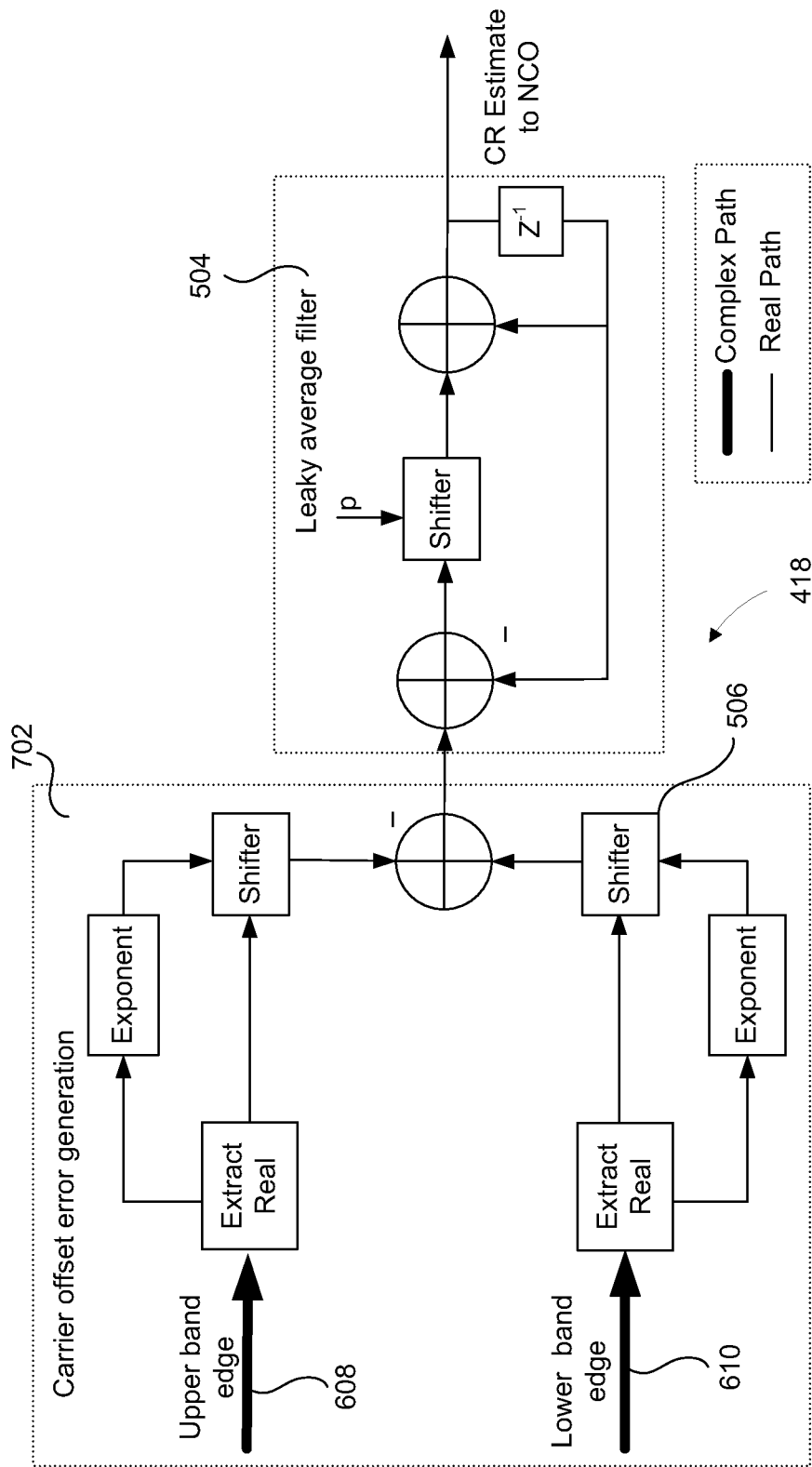
FIG. 7 illustrates an exploded view of a spectrum shape based carrier frequency offset estimation block of FIG. 4 according to an embodiment herein.

FIG. 7 illustrates an exploded view of the CFO estimation block 418 of FIG. 4 according to an embodiment herein. The spectrum shape based CFO estimation block 418 includes the leaky average filter 504, the shifter 506, a carrier offset error generation 702, the upper band edge 608 and the lower band edge 610. Here, the energy of the upper band edge 608 and the lower band edge 610 from the band extraction block (not shown) is computed to extract CFO information. The energy of the upper band edge 608 is subtracted from the energy of the lower band edge 610 to obtain an energy difference. The energy difference of the real components is filtered using the coefficient of the leaky average filter 504. In addition, an option is provided to compensate for spectrum tilt. Here, the use of a multiplier is avoided by shifting real or imaginary component of the band proportional to its exponent value.

Figure 8A:
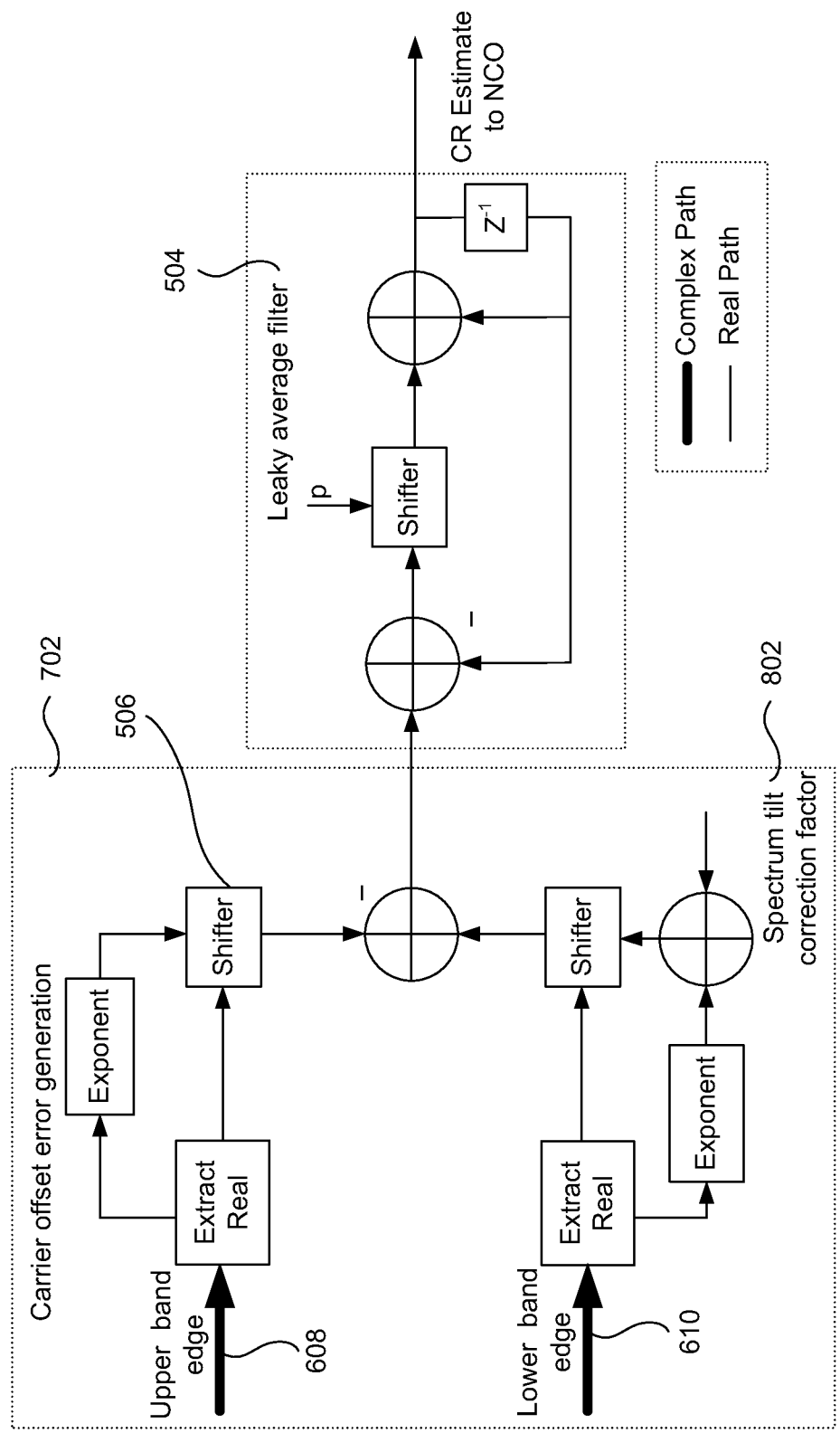
FIG. 8A illustrates an exploded view of a carrier frequency offset estimation block with the spectrum tilt compensation of FIG. 4 according to an embodiment herein.

FIG. 8A illustrates an exploded view of the CFO estimation block 418 with spectrum tilt compensation 420 of FIG. 4 according to an embodiment herein. The CFO estimation block 418 with spectrum tilt compensation 420 includes the leaky average filter 504, the shifter 506, the carrier offset error generation 702, the upper band edge 608, the lower band edge 610, and a spectrum tilt 802. The CFO estimation block 418 with spectrum tilt compensation 420 indicates the optimized implementation with an option to compensate the lower band edge 610 proportional to the spectrum tilt 802. In one embodiment, the receiver also compensates the performance degradation caused by the spectrum tilt 802, and modifies CFO estimation scheme accordingly. It is assumed that spectrum tilt information is known when the analog signal chain is characterized.

Figure 8B:
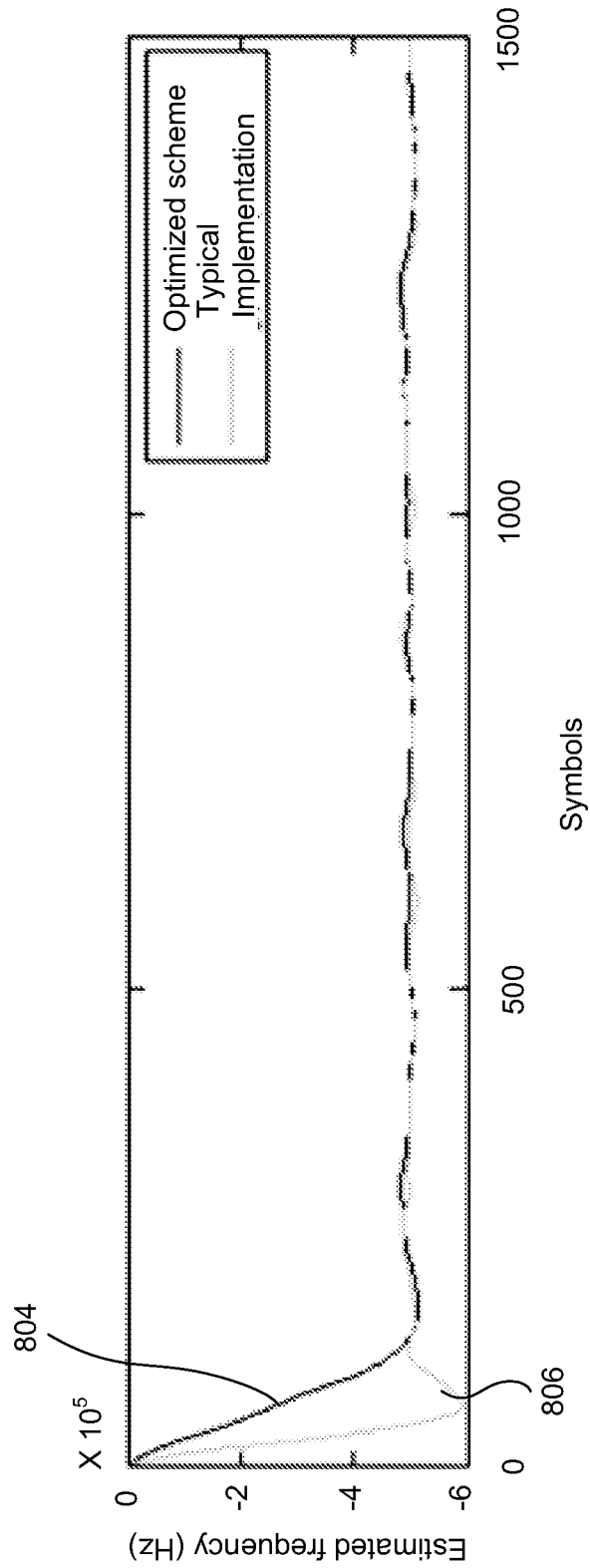
FIG. 8B is a graphical representation illustrating a performance comparison of a typical and optimized carrier frequency offset estimation according to an embodiment herein.

With reference to FIG. 8A, FIG. 8B is a graphical representation illustrating a performance comparison between a typical Carrier Frequency Offset estimation and an optimized of Carrier Frequency Offset estimation according to an embodiment herein. A graph 804 illustrates a number of symbols in the X-axis and an estimated frequency (Hz) in the Y-axis. This graphical representation indicates the performance comparison of carrier frequency offset estimation between a typical method and the optimized scheme according to the embodiments herein.

Figure 8C:
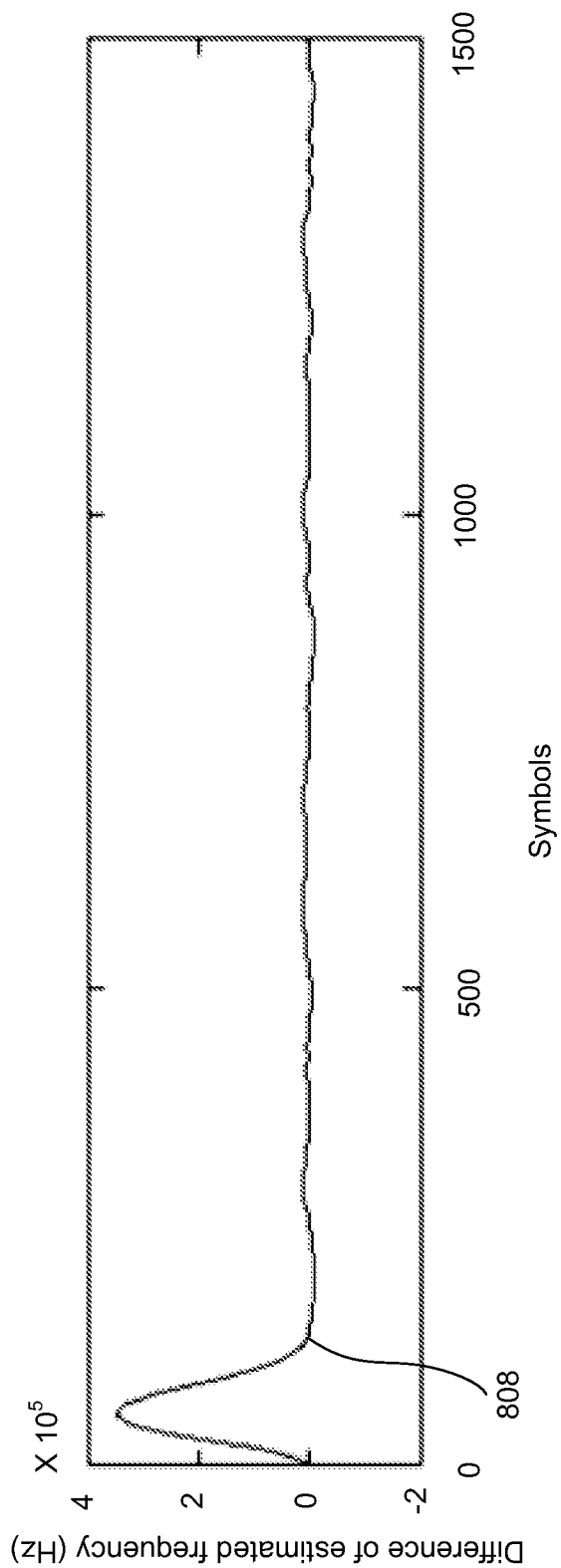
FIG. 8C is a graphical representation illustrating a frequency estimation difference between typical and optimized schemes of carrier frequency offset estimation according to an embodiment herein.

With reference to FIG. 8A, FIG. 8C is a graphical representation of difference in frequency estimation between a typical and the optimized scheme of carrier frequency offset estimation according to an embodiment herein. Graph 806 illustrates a difference in an estimation of carrier frequency offset between the typical method and the optimized scheme according to the embodiments herein. The graphical representation illustrates a number of symbols in the X-axis and the difference of estimated frequency (Hz) in the Y-axis.

Figure 9:
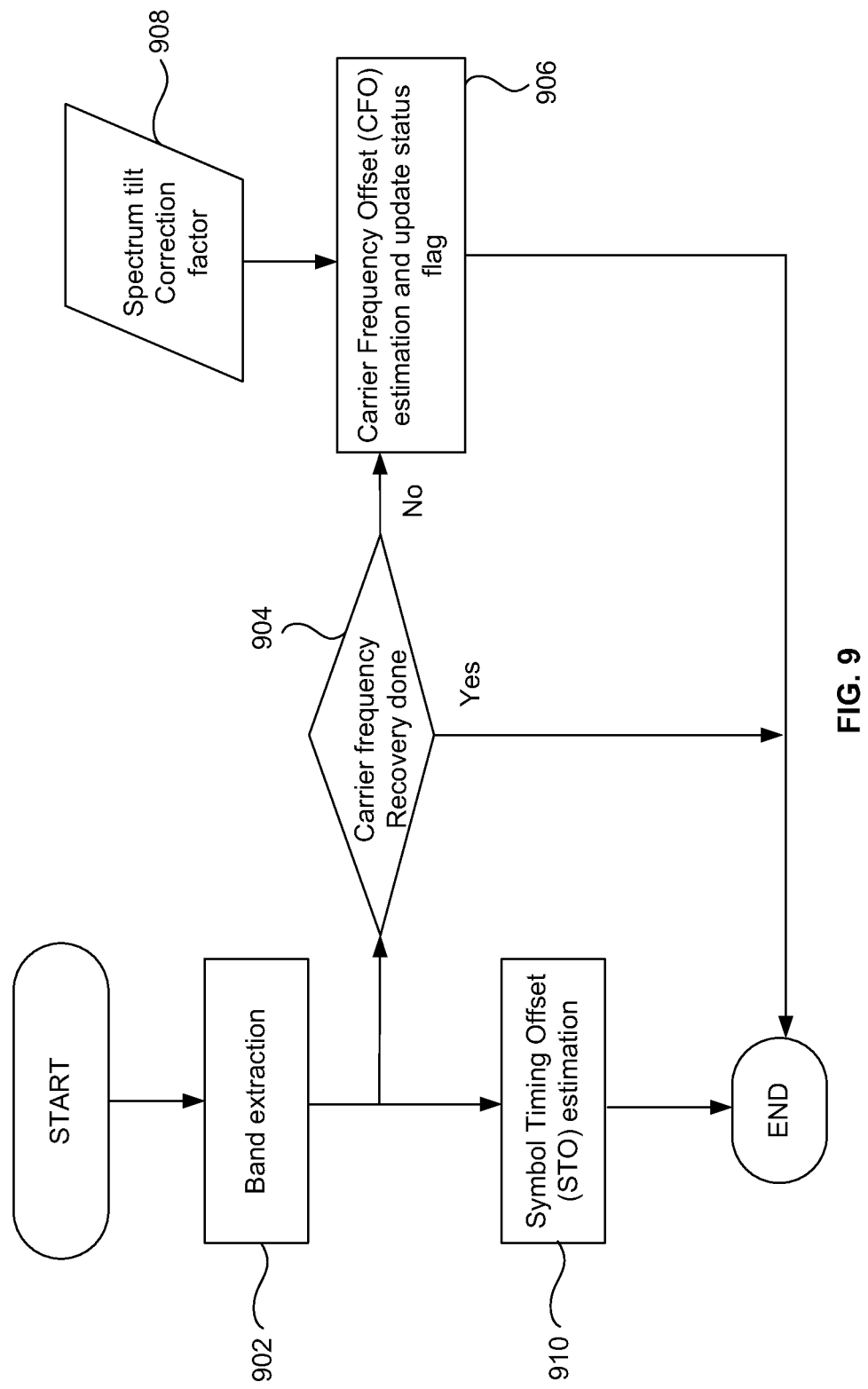
FIG. 9 is a flowchart illustrating a method of estimating a carrier frequency offset and a symbol timing offset concurrently in the receiver of FIG. 4 according to an embodiment herein.

FIG. 9 is a flowchart that illustrating a method for estimating a Carrier Frequency Offset and a Symbol Timing Offset in the receiver 400 of FIG. 4 according to an embodiment herein. In step 902, the upper band edge and the lower band edge are extracted (e.g., using the band extraction block 414 of FIG. 4) from an output received from the sample rate converter block 414. In step 904, it is determined whether a carrier frequency is recovered. In step 906, the carrier frequency offset estimation is performed and a carrier lock flag is generated. In step 908, the spectrum tilt correction factor influences an accurate estimation of CFO by compensating for the spectrum tilt. In step 910, the STO estimation is performed with the upper band edge and the lower band edge (extracted by the band extraction block 414). In addition, when concurrent estimation of STO and CFO is performed a faster steady state is obtained.

In one embodiment, the receiver 400 provides a method to reliably estimate CFO in the presence of spectrum tilt by compensating for the tilt information. It also provides a low-complexity and reduced implementation scheme for the Symbol Timing Offset (STO) and the Carrier Frequency Offset (CFO) by using shifters instead of multipliers.

Figure 10:
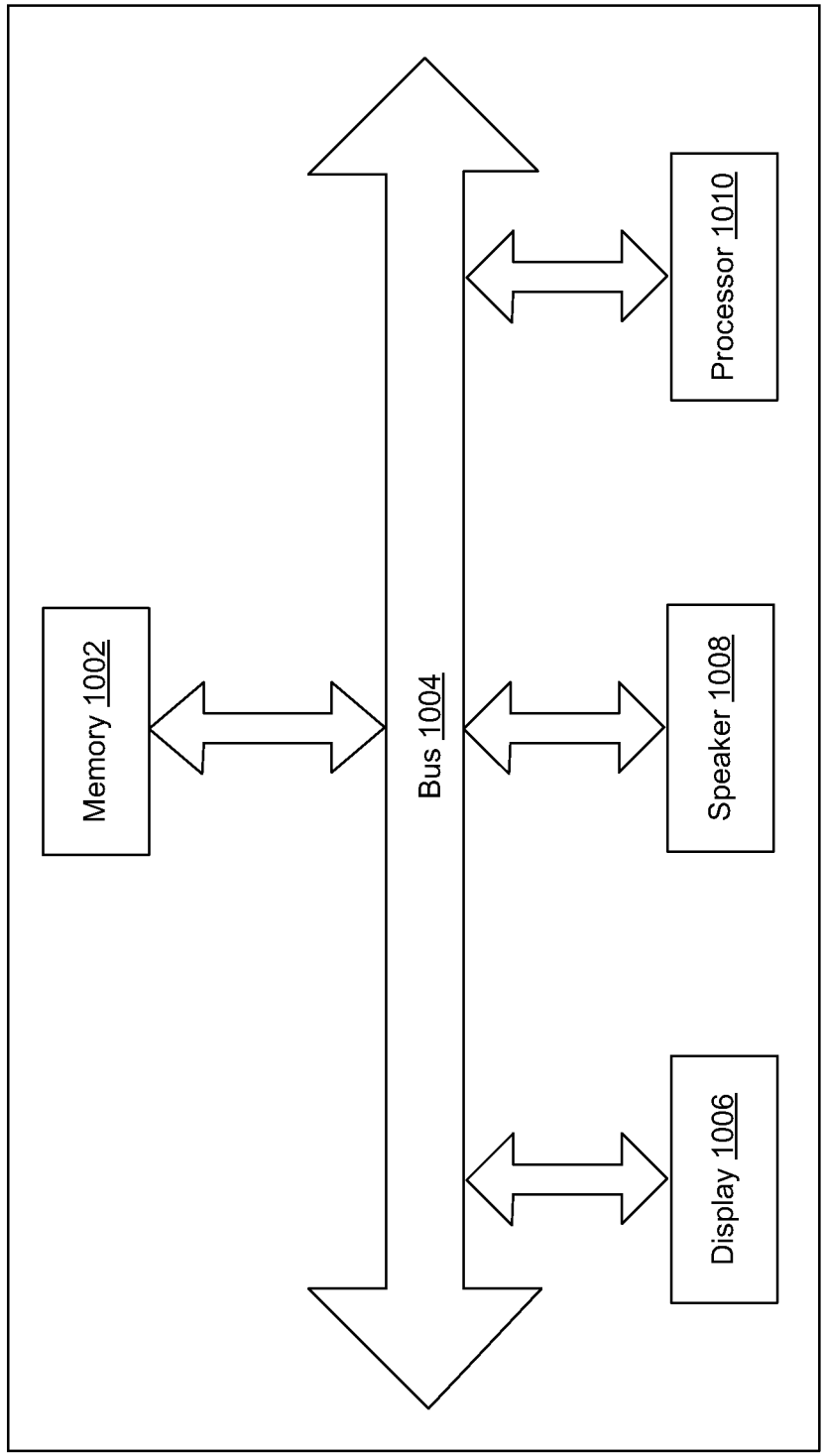
FIG. 10 illustrates an exploded view of a receiver according to an embodiment herein.

FIG. 10 illustrates an exploded view of the receiver 400 having an a memory 1002 having a computer set of instructions, a bus 1004, a display 1006, a speaker 1008, and a processor 1010 capable of processing a set of instructions to perform any one or more of the methodologies herein, according to an embodiment herein. The processor 1010 may also enable digital content to be consumed in the form of video for output via one or more displays 1006 or audio for output via speaker and/or earphones 1008. The processor 1010 may also carry out the methods described herein and in accordance with the embodiments herein. Digital content may also be stored in the memory 1002 for future processing or consumption. The memory 1002 may also store program specific information and/or service information (PSI/SI), including information about digital content (e.g., the detected information bits) available in the future or stored from the past.

A user of the receiver 400 may view this stored information on display 1006 and select an item of for viewing, listening, or other uses via input, which may take the form of keypad, scroll, or other input device(s) or combinations thereof. When digital content is selected, the processor 1010 may pass information. The content and PSI/SI may be passed among functions within the receiver 1000 using bus 1004.

Figure 11:
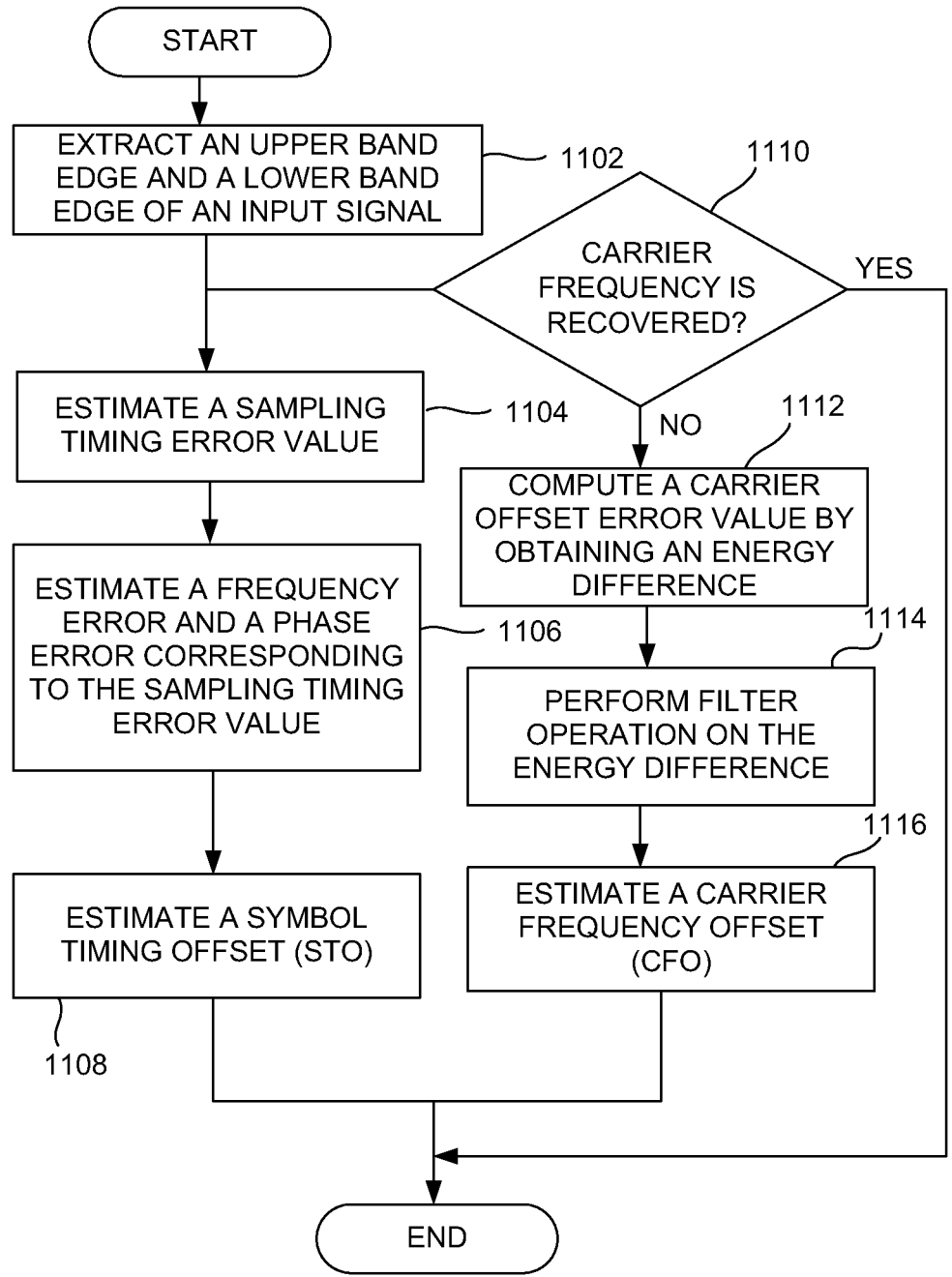
FIG. 11 is a flow diagram illustrating a method for reducing implementation complexity in estimation of a Carrier Frequency Offset (CFO) and a Symbol Timing Offset (STO) for an input signal for spectrally shaped multiple communication standards in the receiver of FIG. 4 according to an embodiment herein.

FIG. 11 is a flow diagram illustrating a method for reducing implementation complexity in estimation of a Carrier Frequency Offset (CFO) and a Symbol Timing Offset (STO) for an input signal for spectrally shaped multiple communication standards in the receiver 400 of FIG. 4 according to an embodiment herein. In step 1102, a lower band edge and an upper band edge of the input signal are extracted. In step 1104, a sampling timing error value is estimated by multiplying the upper band edge with a conjugate of the lower band edge. In step 1106, a frequency error and a phase error corresponding to the sampling timing error value are estimated using a proportion integral (PI) based a second order Phase Lock Loop (PLL). In step 1108, the Symbol Timing Offset (STO) is estimated. In step 1110, it is checked whether a carrier frequency is recovered. If yes, then carrier offset error value is computed by obtaining an energy difference between the upper band edge and the lower band edge in step 1112 and filter operation is performed on the energy difference in step 1114 and finally the CFO is estimated in the step 1116.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for reducing implementation complexity in estimation of a Carrier Frequency Offset (CFO) and a Symbol Timing Offset (STO) for spectrally shaped multiple communication standards, said system comprising:
   a carrier frequency offset (CFO) estimation block that controls a down conversion of an input signal to lock a carrier frequency;
   a band extraction block that extracts a lower band edge and a upper band edge of said input signal required for said CFO and said STO estimation; and
   a symbol timing offset (STO) estimation block comprising:
      a sample error generation block that generates a sampling timing error value by multiplying said upper band edge with a conjugate of said lower band edge, and
      a phase lock loop block that estimates a frequency error and a phase error corresponding to said sampling timing error value,
   wherein a spectrum tilt correction factor obtained from a tilt information and a corresponding shift value is applied to estimate said CFO, wherein said tilt information is obtained from a tuner.

2. The system of claim 1, wherein said frequency error and said phase error are estimated using a proportion integral (PI) based second order Phase Lock Loop (PLL).

3. The system of claim 1, wherein said tilt information is compensated with said CFO estimation block for performing a concurrent estimation of said CFO and said STO.

4. A system for reducing implementation complexity in estimation of a Carrier Frequency Offset (CFO) and a Symbol Timing Offset (STO) for spectrally shaped multiple communication standards, said system comprising:
   a symbol timing offset estimation block that estimates said STO;
   a band extraction block that extracts a lower band edge and an upper band edge of a input signal required for estimation of said CFO; and
   a carrier frequency offset (CFO) estimation block comprising:
      a carrier offset error generation block that generates a carrier offset error value by obtaining an energy difference between said upper band edge and said lower band edge, and
      a leaky average block that performs a filtering operation on said energy difference,
   wherein a spectrum tilt correction factor obtained from a tilt information and a corresponding shift value is applied to estimate said CFO, wherein said tilt information is obtained from a tuner.

5. The system of claim 4, wherein said tilt information is compensated with said CFO estimation block for performing a concurrent estimation of said CFO and said STO.

6. The system of claim 4, further comprising:
   an analog front end that receives an input signal and down-converts said input signal to any of an Intermediate Frequency (IF) signal, a Low Intermediate Frequency (LIF), and a Zero IF(ZIF);
   an analog to digital converter (ADC) that converts any of said IF signal, said LIF, and said ZIF into a digital signal;
   a numerically controlled oscillator (NCO) that generates a phase value; and
   a down conversion block that down converts said digital signal to a baseband complex signal using a mixer based on said phase value.

7. The system of claim 4, further comprising:
   a signal conditioning filter directly connected to said down conversion block, wherein said signal conditioning filter rejects an unwanted out-of-band signals from said baseband complex signal.

8. The system of claim 7, further comprising a sample rate converter (SRC) that converts said baseband complex signal to a required sampling frequency and phase.

9. A method for reducing implementation complexity in estimation of a Carrier Frequency Offset (CFO) and a Symbol Timing Offset (STO) for an input signal for spectrally shaped multiple communication standards in a receiver, said method comprising:
   extracting an upper band edge and a lower band edge of said input signal;
   estimating said STO based when said upper band edge and said lower band edge are extracted;
   determining whether a carrier frequency is recovered; and
   estimating said CFO only when said carrier frequency is not recovered,
   wherein a spectrum tilt correction factor influences an accurate estimation of said CFO based on a spectrum tilt information obtained from a tuner of said receiver.

10. The method of claim 9, wherein said estimating said STO comprises:
    estimating a sampling timing error value by multiplying said upper band edge with a conjugate of said lower band edge, and
    estimating a frequency error and a phase error corresponding to said sampling timing error value using a proportion integral (PI) based a second order Phase Lock Loop (PLL).

11. The method of claim 9, wherein said estimating said CFO comprises:
    computing a carrier offset error value by obtaining an energy difference between said upper band edge and said lower band edge; and
    performing a filter operation on said energy difference.

* * * * *